Feb. 22, 1966  D. E. CARTER  3,236,092
METHOD AND APPARATUS FOR CONTINUOUS FLOW ANALYSIS
Filed Feb. 21, 1962  2 Sheets-Sheet 1

INVENTOR
DON E. CARTER
BY *Herman C. Bauermeister*
ATTORNEY

Feb. 22, 1966     D. E. CARTER     3,236,092
METHOD AND APPARATUS FOR CONTINUOUS FLOW ANALYSIS
Filed Feb. 21, 1962     2 Sheets-Sheet 2

INVENTOR
DON E. CARTER
BY Herman O. Bauermeister
ATTORNEY

United States Patent Office 3,236,092
Patented Feb. 22, 1966

3,236,092
METHOD AND APPARATUS FOR CONTINUOUS FLOW ANALYSIS
Don E. Carter, St. Louis, Mo., assignor to Monsanto Company, a corporation of Delaware
Filed Feb. 21, 1962, Ser. No. 174,853
42 Claims. (Cl. 73—23.1)

The present patent application is a continuation-in-part of Serial No. 46,577 filed August 1, 1960 and now abandoned.

The present invention relates to a method and apparatus for determining the composition of a continuous flow of a fluid having one or more components in unknown degrees of concentration. More particularly this invention relates to a method and apparatus for the chromatographic analysis of flowing streams of gas or liquid without interrupting the continuity of their flows.

In the prior art, liquid or gas chromatography, wherein the fluid to be analyzed is passed over or through an adsorptive or absorptive material to separate the individual components within the fluid in response to the differing rates and degrees of adsorption or absorption between such materials and the individual components of the fluid, has been a most useful analytical tool in research and laboratory work. In all of the prior art variations of such chromatographic analysis, an isolated quantity or batch of the mixture to be analyzed has been injected into a stream of inert material, usually called the carrier or eluent, which flows continuously through the chromatographic column. If the mixture and carrier are gases or vapors, the process is known as gas chromatography. If these materials are liquids, it is known as liquid chromatography.

The individual components of the mixture proceed along the column at characteristically different rates; and, if the column is sufficiently long, the components emerge from the column in substantially pure form, one after the other. If a detector is placed at the outlet of the column, the proportions of the various components may be deduced, after suitable calibration of the detector, from its response as the various components pass through it. Sometimes, particularly in chromatography of liquids, the process is continued only long enough for the individual materials to become distributed along the length of the column. The materials are recovered by unpacking the column in sections and collecting the materials from their respective sections. In another common modification, usually used in chromatography of liquids, the column is replaced by a sheet of paper, and the individual components are separated by cutting out appropriate parts of the paper.

Two or three-dimensional chromatography is also known and practiced. This is frequently done by causing the materials to move through a chromatographic substrate in one direction by a carrier fluid and at the same time to move in another direction by application of thermal and/or electrical gradients oriented at angles to the carrier fluid flow. A two-dimensional method, sometimes used with paper chromatography, is to distribute the materials by a one-directional flow of a carrier fluid and then to rotate the paper 90° and distribute the materials in this new direction by the flow of another carrier fluid. This last technique is confined almost exclusively to liquid chromatography, because the type of carrier used rarely affects significantly the movement of the materials in gas chromatography.

It has sometimes been found possible to conduct chromatographic separations continuously by two or three dimensional techniques by simultaneous application of a carrier flow and electrical and/or thermal gradients. This method has not, however, found wide application because of its mechanical and operational complexity, the large carrier flows required, and the fact that in many cases, the separations obtained are not very complete.

In all the prior art modifications, an analysis of an unknown mixture is obtained by bringing about a distinct and substantially complete separation of the materials present in the mixture. This requires that a long and cumbersome chromatographic column be employed and that a substantial amount of time be consumed in the passage through the column of the material to be analyzed. Furthermore, in the applications of analytical chromatography, which have been reported in the literature, and especially in analysis of gases or vapors, it has been found necessary to use a batchwise technique. It follows therefore that, prior to this invention, it was impossible to obtain other than an analysis of discrete samples and such a batch analysis could be read only a relatively long time after the samples had been started through the column. This is a serious limitation, particularly for process control applications. What has been needed is a device which continuously samples the stream to be analyzed and continuously indicates its output, with little time delay.

A further disadvantage of the prior art methods is that, if an analyzer which uses them is to operate automatically, a complicated valving and switching arrangement is required to measure and introduce the sample and a complicated electrical system is needed for identifying and measuring the response of the detector to the individual components as they pass through it.

It is accordingly an object of the present invention to provide improvements in the art of analyzing the composition of a mixture of unknown components.

It is a further object of the present invention to provide a method for the continuous analysis of a flowing fluid by chromatographic segregation.

It is yet another object of the present invention to provide a method and apparatus for the chromatographic analysis of a continuously flowing fluid which will eliminate the need of analyzing separate batches of the fluid and a long chromatographic tube.

It is yet a further object to provide a mechanically simple method for continuous chromatographic analysis of mixtures.

These and other objects and advantages which will be apparent from a reading of the following disclosure are achieved in the first instance by the use of means for varying as by alternately increasing and decreasing the flow of the fluid to be analyzed into or through the chromatographic column. Where, as is usually the case and in accordance with the prior art procedure, the fluid to be analyzed is vaporized and admixed with and diluted by a carrier fluid, the desired variation of the flow of the mixture to be analyzed is achieved by varying the concentration of such mixture in the carrier fluid. This variation, to be provided according to means hereinafter described, may be of a cyclic or periodic nature so that the concentration of the test mixture changes in a regular and repetitive fashion with the progress of time and the progress of the fluid through the chromatographic apparatus. It is recognized that inputs other than periodic or cyclic such, for example, as transient responses or responses to random inputs may be analyzed and correlated to determine what the response would be to a cyclic input. It follows, therefore, that methods or inputs other than purely cyclic variations can be used according to the teachings of this invention.

It has been found that, if a periodic input is employed, the frequency of the cycles or periodicity of the flow of each component of the test mixture through the chromatographic apparatus will remain constant while the wave length of the flows of the individual components within the test fluid will be altered, depending upon the rate and degree of their adsorption or absorption on the material within the chromatographic column. Readings of the periodic variation in the total concentration of the test fluid at separate points along the length of the chromatographic column may then be made and correlated with previously established wave lengths for the pure components passing through such column. A correlation of the readings of the test fluid at various points along the length of the tube with the known patterns of the pure constituents then leads to an analysis of the components in the test fluid and their respective degrees of concentration therein.

Because the time-varying characteristics are thus being analyzed, there is no need to employ batches or to stop the continuity of the flow through the chromatographic apparatus. At the same time, since only a readable variation or displacement between the flow of the constituents and/or the total test fluid and the originally imparted periodicity is required, only a minimal segregation of the components is required; and this may be achieved almost instantaneously after the test fluid passes through a chromatographic column of relatively short length. The significance of this achievement is apparent when it is considered that in the prior art chromatographic devices, a tube or column of the adsorptive or absorptive material, either a particulate solid or a particulate substance impregnated with a liquid, of from three to fifty feet in length and up to thirty or forty-five minutes were required for the passage of the fluid therethrough. The present invention can in many cases effect complete analysis by using tubes on the order of two to four inches in length and readable at any desired instant without interrupting the process, and with minimal time delay.

In the reading of the flow characteristics at different points along the length of the tube or between separate chromatographic tubes arranged in series or in parallel as hereinafter described, detectors according to those employed in prior art such as thermal conductivity, refractive index, dielectric constant, flame temperature, color, acidity or alkalinity, density, radiation, electromagnetic wave, radio frequency, infrared, viscosity, etc. sensing devices may be employed. Where, as in most cases, readings of the cyclic or periodic pattern of the flow of the test fluid through the chromatograph must be made at several different points in order to obtain sufficient data for the complete interpretation of the analysis, the chromatographic column may be divided into a plurality of smaller columns between each pair of which a detector or sensing device is located for reading the flow characteristics at that particular point. These relatively shorter columns or tubes may be arranged in series; i.e., in such a manner that the fluid will flow consecutively through each of the tubes; or, according to a modification of this invention, the separate tubes may be arranged in parallel; i.e., the test fluid may be split and allowed to flow through a plurality of separate tubes which are not interconnected, but which vary in length so that in effect readings for various column lengths are obtained.

The invention thus generally described may be more clearly understood by reference to the following detailed description of certain specific embodiments thereof in connection with which reference may be had to the appended drawings.

Figure 1:
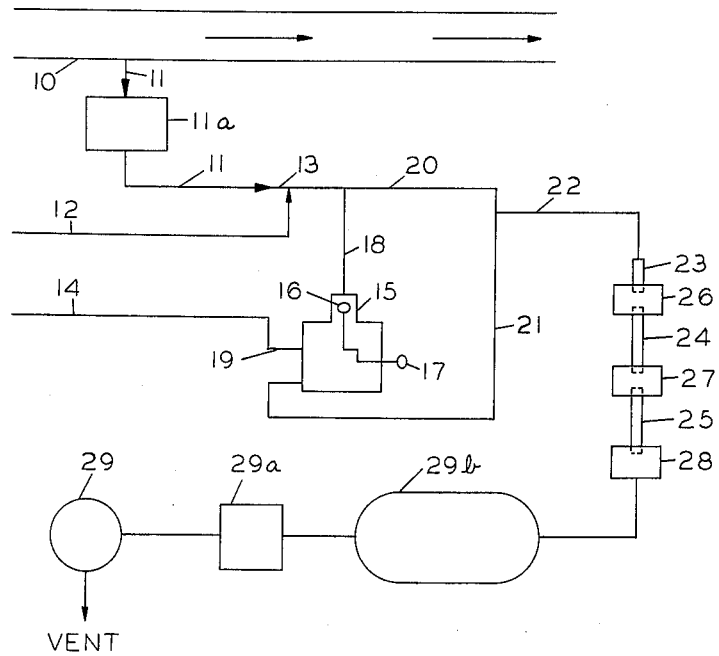
FIGURE 1 is a schematic illustration of one form of chromatographic apparatus according to the present invention.

Referring now to FIGURE 1, the test fluid to be analyzed such as a mixture of gaseous components which is in the process of being transmitted through a conduit 10 in an operating production system may be led from such conduit into the sampling conduit 11 which may include a vaporizer 11a. Once the sample or test portion of the fluid is in the sample passage, it may be diluted with a suitable diluent such as helium or hydrogen gas introduced to the passage 11 from the diluent passage 12. Beyond the juncture 13 of the diluent passage 12 with the test or sample conduit 11, the gas is finally in the form in which it is to be tested and analyzed; but it is usually found desirable to admix the test gas with a large quantity; e.g., from 100 to 1 to 1,000 to 1 volumetrically of an inert carrier gas such as helium or hydrogen, the primary function of which is to carry or transport the test gas through the chromatographic material. Such carrier gas may be supplied from the conduit 14. Where the system operates under a vacuum, however, a lesser quantity of the carrier gas may be employed.

Where, in accordance with the present invention, it is desired to impart a periodic or cyclic variation to the concentration of the test gas in the carrier gas, a suitable pumping device or wave generating mechanism may be employed in connection with the channels supplying the respective test and carrier gases. As shown in FIGURE 1 such a device may comprise a pump housing 15, reciprocably moving in which is a plunger or piston 16 which is driven by a suitable prime mover 17 and a shaft and/or gear connection which causes the piston to reciprocate in simple harmonic motion. This wave generator should be so associated with the above described passages that the pump assembly on one side of the piston 16 is associated with the test gas by the channel 18 and on the other side of the piston with the carrier gas by the passage 19. As the piston 16 reciprocates, it will alternately store first the carrier gas and then the test gas in the wave generator with the result that the out-put flow from the generator as influenced by the controlled pressures upon the test gas and the carrier gas through the conduits 20 and 21 will result in a flow within the trunk line 22 of a mixture of test gas and carrier gas wherein the concentration of the test gas will vary in a desired periodic fashion. Where the piston 16 is driven in simple harmonic motion, the variation of the concentration of the test gas in the trunk line 22 will be sinusoidal. The nature of this sinusoidal wave pattern at some particular instant in time is shown graphically on the chart of FIGURE 4.

The flow thus established is then carried by the channel 22 to the chromatographic apparatus, which, in the case of the preferred embodiment illustrated in FIGURE 1, consists of a number of separate chromatograph tubes 23, 24 and 25 all of which are arranged in series or sequence so that all of the gas passing through any one of the tubes also passes through the others. In effect it might be said that the three separate tubes 23, 24 and 25 constitute a single chromatographic tube according to the prior art devices except, of course, that even the total length of these tubes may be of a much shorter length than the length of the tubes heretofore required. The result of this arrangement is that, if detectors such as 26, 27 and 28 are placed as shown in FIGURE 1, they will be detecting or analyzing the characteristics of the gas flow at points which would be equivalent to measturing such flow at spaced points along a continuous tube. Thus, the detector 26 measures some or a combination of the characteristics of the gas after it has traveled the length of the tube 23, the detector 27 measures the characteristics after the gas has traveled the combined lengths of tubes 23 and 24, and the detector 28 measures the flow characteristics after the gas has traveled the entire combined lengths of tubes 23, 24 and 25. While not essential, it may be desirable to use a suitable vacuum pump 29, a pressure regulator 29a and a surge tank 29b to keep a constant pressure at the column discharge thereby eliminating from the analysis such variations as might arise from different adsorptive or absorptive properties of the constituent gases under different pressures and different volumetric flow rates through the column.

Figure 2:
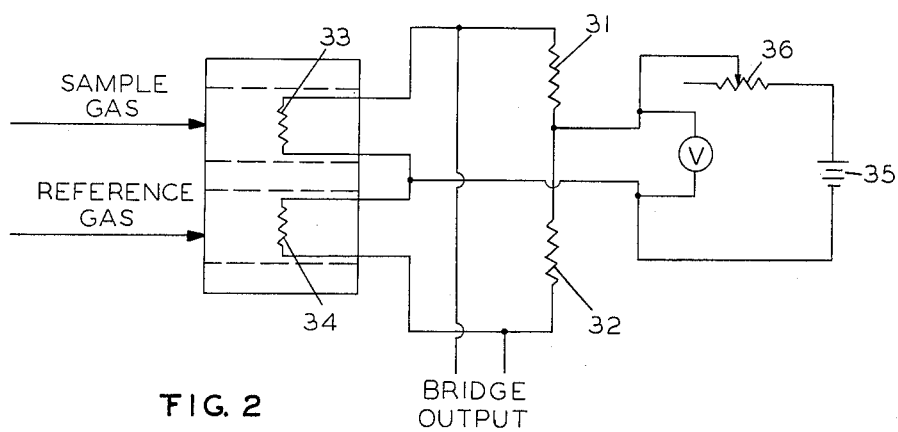
FIGURE 2 is a wiring diagram for a thermal conductivity type cell to be used as a detector for reading the wave characteristics in a device according to the present invention.

The detectors 26, 27 and 28 may, as stated above, take the form of any of the several prior art devices; but one specific detector or sensing device is a thermal conductivity cell which is shown in detail in FIGURE 2. The detector here shown comprises a conventional bridge circuit which consists of two fixed resistors 31 and 32 and two resistance heating elements 33 and 34. The element 33 is located in the test gas stream and the element 34 in a flow of gas of constant composition, usually the carrier gas. The bridge is energized by the battery 35 and the applied potential adjusted by the rheostat 36. Once the electrical energy input is set, the temperature of the sensing element 33 in the test gas stream should remain constant except insofar as radiation and heat transfer therefrom are determined or affected by the nature of the test or sample gas surrounding this element. Therefore, as the heat-transfer properties of the gas surrounding the element 33 change, the temperature of the element also changes. This causes a change in the resistance of the sensing element 33 with a consequent change in bridge output. This change in bridge output is continuously recorded in such a manner as to reflect the sinusoidal variations in the concentrations of the test gas after it has passed through different lengths of the chromatographic column.

For calibration of the instrument where such a detector is employed in the device illustrated in FIGURE 1, pure gases such as those suspected as being the components of the mixture to be analyzed may be passed through the testing apparatus at the pre-determined input frequency of the test gas, and the variations in their characteristics may then be detected by the sensing element 33 to establish the phase relationship of the pure gas waves at the various detectors relative to the input wave.

Figure 3:
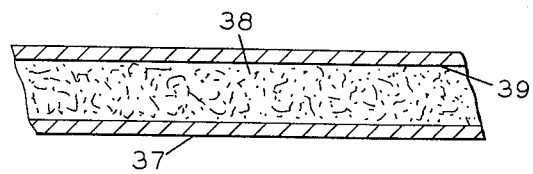
FIGURE 3 is an enlarged cross sectional fragmentary view of a chromatographic tube for use according to the present invention.

The chromatographic tubes such as 23, 24 and 25 of FIGURE 1 are shown in FIGURE 3 to comprise a hollow or cylindrical tubular member 37, the interior of which contains a plurality of particles 38 such as specially treated brick, silica or alumina impregnated with some high boiling liquid which results in surface characteristics which will cause the gaseous substances of the fluid being analyzed and passing through the channel 39 of the tube to associate themselves with the particles for some length of time until they are washed therefrom and carried on down the length of the tube under the influence of the continuously flowing carrier gas. Because the individual constituent gases will have different degrees and rates of adsorption or absorption with the particulate material, these components will pass through the tube at different characteristic rates. In the prior art devices these differences in the characteristic rates of the individual components had to be exploited until a substantially complete separation of the individual components in a batch of feed was attained. The present invention takes advantage of the discovery that, if a sinusoidal or other cyclical variation is imposed on the concentration of a continuous stream of feed gas in the carrier gas, there will occur a sinusoidal or related cyclical variation with time. There may also be present a "direct current component" corresponding to the non-cyclic component of the concentration waves. Accordingly the sum of the individual component concentrations at any pre-selected fixed position along the column and the phase of this sinusoidal variation in total composition will be related to the phase of the input concentration wave by an angle which is a function of the composition of the input gas.

Where, as in the case of this preferred embodiment, the variation in the concentration of the test gas is controlled at the input by the piston driven in simple harmonic motion to impart a sinusoidal variation in the concentration of the test gas, each of the constituents will pass through the chromatograph in a sine wave having a velocity different from that of each of the other constituents, but the frequency of each will be the same as the input frequency. Stated otherwise, each of the components will pass through the chromatographic device with a different wave length.

Figure 4:
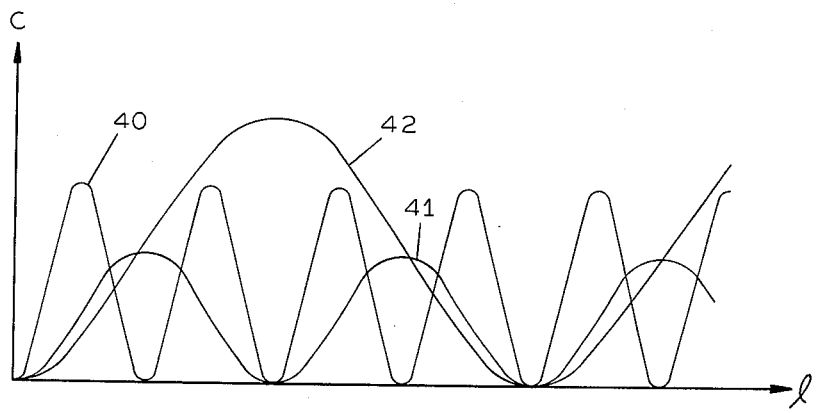
FIGURE 4 is a graphic representation of the wave characteristics of the variations of the concentrations of the individual components of a test gas with length of passage through the chromatographic tube at a particular instant in time.
Figure 5:
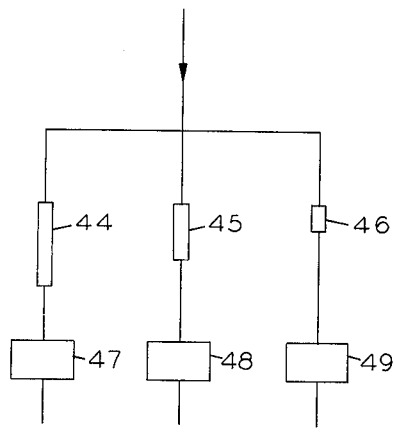
FIGURE 5 is a schematic illustration of a modified arrangement of the chromatographic tubes and detectors in a device according to the present invention.

The situation existing along the length of the column at some particular instant in time is graphically illustrated in FIGURE 4 wherein the vertical coordinate is the degree of concentration of the test gas at a particular instant and the horizontal coordinate is the position along the length of the chromatographic tube. Line 40 shows the variation of concentration with length for the fastest moving component. Line 41 shows the variation of concentration for the intermediate speed component, and line 42 the variation for the slowest moving component. The development of an equation, describing the situation shown in FIGURE 4 is as follows:

Consider a chromatographic column of length $l$ to which is applied an input containing components 1, 2, ..., $n$. The total concentration is made to vary sinusoidally with time. Then at any fixed length $l_a$ along the column, the variation in total concentration $$C_{1_a}(t)$$

can be written $$C_{1_a}(t) = A_1 + A_1 \sin(\omega t + \alpha_1) + A_2 \sin(\omega t + \alpha_2) + \ldots + A_n + A_n \sin(\omega t + \alpha_n) \quad (1)$$

where $A_1, A_2 \ldots A_n$ = concentrations of components 1, 2, ..., $n$ in feed $\omega t$ = angle of input sine wave (radians)

$\alpha_n$ = phase associated with component $n$ at $l_a$ (radians)

Applying the well-known formula for the sine of the sum of two angles gives $$C_{1_a}(t) = \sum_1^n A_n + A_1(\sin \omega t \cos \alpha_1 + \cos \omega t \sin \alpha_1)$$
$$+ A_2(\sin \omega t \cos \alpha_2 + \cos \omega t \sin \alpha_2)$$
$$+ \ldots$$
$$+ A_n(\sin \omega t \cos \alpha_n + \cos \omega t \sin \alpha_n) \quad (2)$$

This may be rearranged to $$C_{1_a}(t) = \sum_1^n A_n + (A_1 \cos \alpha_1 + A_2 \cos \alpha_2 + \ldots + A_n \cos \alpha_n) \sin \omega t + (A_1 \sin \alpha_1 + A_2 \sin \alpha_2 + \ldots + A_n \sin \alpha_n) \cos \omega t \quad (3)$$

Applying another well-known formula gives $$C_{1_a}(t) = \sum_1^n A_n + \sqrt{(A_1 \sin \alpha_1 + A_2 \sin \alpha_2 + \ldots + A_n \sin \alpha_n)^2 + (A_1 \cos \alpha_1 + A_2 \cos \alpha_2 + \ldots + A_n \cos \alpha_n)^2} \quad (4)$$

times sin $$\left[ \omega t - \tan^{-1} \frac{A_1 \sin \alpha_1 + A_2 \sin \alpha_2 + \ldots + A_n \sin \alpha_n}{A_1 \cos \alpha_2 + A_2 \cos \alpha_2 + \ldots + A_n \cos \alpha_n} \right]$$

Equation (4) shows that at $1_\alpha$ the variation in total concentration should be sinusoidal; that the phase of the total concentration sine wave relative to the inlet concentration wave should be the angle $\phi_\alpha$, where $$\phi_\alpha = \tan^{-1}\frac{A_1 \sin \alpha_1 + A_2 \sin \alpha_2 + \ldots + A_n \sin \alpha_n}{A_1 \cos \alpha_1 + A_2 \cos \alpha_2 + \ldots + A_n \cos \alpha_n} \quad (5)$$

and that the amplitude of the total concentration sine wave should be $$H_\alpha \sqrt{\frac{(A_1 \sin \alpha_1 + A_2 \sin \alpha_2 + \ldots + A_n \sin \alpha_n)^2 +}{(A_1 \cos \alpha_1 + A_2 \cos \alpha_2 + \ldots + A_n \cos \alpha_n)^2}} \quad (6)$$

The analogous expressions for the phase $\phi_\beta$ and amplitude $H_\beta$ at length $l_\beta$ would be $$\phi_\beta = \tan^{-1}\frac{A_1 \sin \beta_1 + A_2 \sin \beta_2 + \ldots + A_n \sin \beta_n}{A_1 \cos \beta_1 + A_2 \cos \beta_2 + \ldots + A_n \cos \beta_n} \quad (5a)$$

and $$H_\beta \sqrt{\frac{(A_1 \sin \beta_1 + A_2 \sin \beta_2 + \ldots + A_n \sin \beta_n)^2 +}{(A_1 \cos \beta_1 + A_2 \cos \beta_2 + \ldots + A_n \cos \beta_n)^2}} \quad (6a)$$

Similar expressions may be written for phase and amplitude at lengths $1_\gamma$, $1_\delta$, etc., in terms of terms of pure component phase lags $\gamma_1, \ldots, \gamma_n; \delta_1, \ldots, \delta_n$; etc.

It is also true that the amplitude of the inlet total concentration sine wave $H_i$ must equal the sum of the concentrations of its individual components, i.e., $$H_i = A_1 + A_2 + \ldots + A_n \quad (7)$$

It is clear a set of $n$ equations made up of equations of the types of Equation (5), Equation (6) and Equation (7) are a set of independent algebraic equations which if the appropriate phases and amplitudes are known can be solved for concentrations $A_1, \ldots, A_n$ of the individual components of the making up the mixture entering the chromatographic column. This requires that the phase angles associated with the pure components (the $\alpha$'s, $\beta$'s, $\gamma$'s, $\delta$'s, etc.) have previously been determined, either by passing the pure components through the column or by application of a regression technique to mixtures of known composition.

If Equation (7) is used with $n-1$ measurements of phase (for an $n$ component mixture) entered in equation of the type of Equation (5) a set of simultaneous linear algebraic equations results which can be solved for the concentrations of the components of the mixture entering the chromatograph. Similarly Equation (7) can be used with $n-1$ measurements of amplitude entered in equations of the type of Equation (6) to give a set of nonlinear algebraic equations which can be solved for the concentrations of the components of the entering mixture. Other combinations of Equations (5), (6) and (7) and phase and amplitude measurements to give $n$ independent equations which can be solved for the concentration of the components of the entering mixture are possible.

A useful computational simplification results from normalizing the output total concentration waves by making $H_i = 1$. This was done in the example reported herein.

In order to apply Equation (4) and Equation (5) and (6) which are derived from it to the physical chromatograph described herein, some modification of the equations may be necessary. One modification results from the fact that in practice, the sine waves are somewhat attenuated as they pass along the column. This can be accounted for by inclusion of attenuation factors $\circledH_{\alpha_1}, \ldots, \circledH_{\alpha_n}$ for column length $1_{\alpha_n}$, $\circledH_{\beta_1}, \ldots, \circledH_{\beta_n}$ for column length $1_{\beta_n}$; etc., in Equation (4).

$$C_1(t) = \sum_{1}^{n} A_n +$$

$$\sqrt{\frac{(A_1 \circledH_{\alpha_1} \sin \alpha_1 + A_2 \circledH_{\alpha_2} \sin \alpha_2 + \ldots + A_n \circledH_{\alpha_n} \sin \alpha_n)^2 +}{(A_1 \circledH_{\alpha_1} \cos \alpha_1 + A_2 \circledH_{\alpha_2} \cos \alpha_2 + \ldots + A_n \circledH_{\alpha_n} \cos \alpha_n)^2}}$$

times sin $$\left[ wt + \tan^{-1}\frac{A_1 \circledH_{\alpha_1} \sin \alpha_1 + A_2 \circledH_{\alpha_2} \sin \alpha_2 + \ldots + A_n \circledH_{\alpha_n} \sin \alpha_n}{A_1 \circledH_{\alpha_1} \cos \alpha_1 + A_2 \circledH_{\alpha_2} \cos \alpha_2 + \ldots + A_n \circledH_{\alpha_n} \cos \alpha_n} \right] \quad (8)$$

From Equation (8) the equations analogous to Equation (5) and (6) may be extracted, i.e., $$\phi_\alpha = \tan^{-1}\frac{A_1 \circledH_{\alpha_1} \sin \alpha_1 + A_2 \circledH_{\alpha_2} \sin \alpha_2 + \ldots + A_n \circledH_{\alpha_n} \sin \alpha_n}{A_1 \circledH_{\alpha_1} \cos \alpha_1 + A_2 \circledH_{\alpha_2} \cos \alpha_2 + \ldots + A_n \circledH_{\alpha_n} \cos \alpha_n} \quad (9)$$

and $$H_\alpha = \sqrt{\frac{(A_1 \circledH_{\alpha_1} \sin \alpha_1 + A_2 \circledH_{\alpha_2} \sin \alpha_2 + \ldots + A_n \circledH_{\alpha_n} \sin \alpha_n)^2 +}{(A_1 \circledH_{\alpha_1} \cos \alpha_1 + A_2 \circledH_{\alpha_2} \cos \alpha_2 + \ldots + A_n \circledH_{\alpha_n} \cos \alpha)^2}} \quad (10)$$

Equations (7), (9) and (10) are the working equations for compositions of mixtures run through a physical continuous gas chromatograph, such as described herein. The attenuation factors $\circledH$, like the pure component phase angles, may be determined either from measurements made on pure components or by regression techniques applied to measurements made on mixtures of known composition.

Equations (7), (9) and 10) are the generally useful forms for practical applications; however in order to compensate for certain non-linear effects, which may be important in some cases, a factor for adjusting the pure component phase lags (the $\alpha$'s, $\beta$'s, etc.) may sometimes be useful.

It is apparent from the history of Equations (7), (9) and (10) that the system should if possible be operated in a region where the response of the column and the detectors is linear.

It will be apparent to one skilled in the art that many combinations of phase and amplitude measurements may be used in analysis of particular feed mixtures subject only to the limitation that for an $n$ component mixture, $n$ independent equations must be generated. Such combinations are clearly within the scope of the invention described herein. Another variation of the invention in addition to the constant-flow basis described above is to admix varying quantities of an inert carrier gas with the gaseous flow, passing the mixture through the chromatograph and measuring at pre-determined different lengths along the chromatograph column the changes in the degree of concentration of gaseous flow in the carrier gas with the passage of time.

Typical adsorbents or absorbents for use in gas chromatographic columns are synthetic zeolites, alumina, alumina impregnated with dioctyl phthalate, and other higher organic esters, ground firebrick impregnated with polyethylene glycols and small Teflon particles coated with dioctyl sebacate or other organic esters. Higher molecular weight hydrocarbons such as petroleum jelly are also useful for this purpose.

The preferred base or zero angle for the measurement is either (1) a detector located at the column inlet or (2) the phase of the input signal generator, provided it is closely coupled to the column inlet. The signal for some other detector could also be used as the base or zero angle, and might be preferred in some rare cases, however the form of the coefficients in Equation (7) becomes more complicated when the output of an intermediate or final detector is used, thereby complicating the calibration of the instrument. However, this can be readily handled since the essential change is that the phase angles of the output components are all increased or decreased in magnitude by an amount which corresponds to the difference between the input phase angle and the angle corresponding to any other designated zero point.

In carrying out the process of the present invention, input concentration waves other than sinusoidal may be used. This is apparent because one can observe the responses of the various detectors to other types of input and calculate from these observations what the response to a sinusodial input would have been. There are at least two well-known methods for doing this. One method involves the use of an equation usually called the Fourier transform. To use this method, one makes some variation in the input to the column and observes the response of the various detectors as a function of time. This variation may be in various forms such as a pulse (a change in concentration level from one level to other levels followed by a return to the original level), a step change (a sudden change from one level to another), a ramp change (a gradual steady increase from one level to another) or some other transient variation in concentration. The signals from such input are frequently called "deterministic inputs." The observed variations of concentration with time are then individually inserted into the Fourier transform equation. If $c_1(t)$ is the response of the detector at the column inlet, its Fourier transform, $C_1(jw)$, is $$C_1(jw) = \int_0^t c_1(t) e^{-jwt} dt \qquad (11)$$

Similarly, the Fourier transformer $C_2(jw)$, $C_3(jw)$ ... $C_n(jw)$ or the other detectors can be obtained for the time responses $C_2(t)$, $C_3(t)$ ... $C_n(t)$. This integral is frequently evaluated numerically, often with the aid of a digital computer.

It will be seen that a Fourier transform $C(jw)$ is a complex algebraic number, which, by the rules of complex algebra, may be expressed as an amplitude $|C(jw)|$ and a phase angle $\underline{|C(jw)|}$. From Equation (11), it is seen that the complex number $C(jw)$ is a function of $w$. In many texts on Servomechanisms, cf. Control System Synthesis by Truxal, 1955, McGraw-Hill (New York), pages 375–390, cited above, it is shown that for "linear" systems (the chromatograph is highly linear) taking the ratio $G_{1-2}(jw_o)$ according to the equation $$G_{1-2}(jw_o) = \frac{G_2(jw_o)}{G_1(jw_o)} \qquad (12)$$

where $w_o$ is some constant, the magnitude $|G_{1-2}(jw_o)|$ and angle $\underline{|G_{1-2}(jw_o)|}$ are the amplitude ratio and phase angle which would have resulted between detectors 1 and 2 if a concentration sine wave of unit amplitude and frequency $w_o$ had been applied to the chromatograph. Using this method an input which is other than repetitive or cyclic can be used to compute what the response of the detectors would have been to a sinusoidal input.

It is also possible to use the responses of various detectors to input concentration which vary in a stationary random manner to compute what the responses to sinusoidal input would be. This may be done, for example, by using the equation $$\Phi_{vq}(s) = W(s) \Phi_{vv}(s) \qquad (13)$$

$\Phi_{vq}(s)$ = Cross-power density spectrum of input and output detector signals.
$W(s)$ = Fourier transform of weighting function which relates input and output.
$\Phi_{vv}(s)$ = Power-density spectrum of input detector signal.

The derivation and background of Equation (13) are given in the standard textbooks on employment of random processes in automatic control, for example, in Analytical Design of Linear Feedback Controls by Newton, Gould and Kaiser, 1956, John Wiley (New York), chapters III and IV, especially pp. 113–118.

The signals from the detectors are processed either manually or with the aid of electronic or mechanical computing devices to measure the composition of the sample stream entering the chromatograph. The choice of which approach is to be used depends upon whether the analysis is to be based upon phase measurements, amplitude measurements, or a combination of the two and if sinusoidal or non-sinusoidal inputs are to be used.

For example, if a sinusoidal input and if a manual data reduction method based on phase measurements are to be used, the outputs of all detectors including the zero or reference signal, preferably at the inlet to the column are recorded on a strip chart recorder. The phases between the outputs of any two detectors may be measured by scaling the chart to measure the distance between similar points, e.g. the crossover points, on the two waves. These measured phases are then inserted in equations of the type of Equation 9, together with Equation 7, to obtain a set of linear simultaneous algebraic equations which are then solved by the standard methods of algebra either manually or by an electronic or mechanical computer programed to solve such sets of equations.

If, for example, amplitude measurements are to be used, the amplitudes are obtained by scaling the charts to obtain the amplitudes (the amplitude is half the difference of the magnitude of the maximal and minimal of the sine waves) and inserting these measured amplitudes into equations of the type of Equation 10 together with Equation 7 to obtain a set of non-linear simultaneous algebraic equations which are solved by the standard methods of numerical analysis, either manually or with the aid of computers, to obtain the composition of the sample being fed to the column.

If, for example, a combination of phase and amplitude measurements is to be used, a combination of phase and amplitude measurements are used which lead to a set of non-linear simultaneous algebraic equations of the types Equations 9, 10 and 7 result. These equations similarly may be solved manually or by computers.

In other cases it may be desirable to use electronic or mechanical phase and/or amplitude measuring devices instead of manually scaling the charts. For example, the phase difference can be measured by an appropriately triggered electronic counter.

In many cases it will be desirable to use an integrated computing device which will detect phase and/or amplitude, automatically carry out the necessary arithmetic operations and either display the sample stream composition or provide a signal which will activate other parts of an automatic process control loop. Such integrated computing devices are operated either on the digital or the analog principle and may use either implicit or explicit methods for solution.

If inputs other than sinusoidal are used, the first step is to treat the output data to obtain the required Fourier transforms (Equation 11) or power spectral densities (Equation 13). Because of the labor involved, computers will normally be used in these operations. After the equivalent amplitude and phase data are obtained, the procedure follows that for sinusoidal inputs. It is also to be noted that analysis by Fourier transform or power spectral density leads to phase and amplitude data for a theoretically infinite number of frequencies, and that the use of systems of equations for different frequencies is within the scope of the invention.

It will be apparent to one skilled in in the art that many types of phase and/or amplitude detectors and composition computation methods may be used in the reduction of detector outputs to sample compositions without departing from the scope of this invention.

Essentially, in a specific embodiment the present invention is based on the fact that if a multi-component sample mixed with a carrier gas is fed to a chromatographic column under conditions such that the volumetric gas flow rate is constant, and the total concentration of sample varies sinusoidally, the composition of the sample can be determined from the phase of the total sample concentration sine waves at downstream points.

The application of the present invention to specific embodiments which illustrate but do not limit the invention is shown in the following examples.

*Example 1.*—If a binary mixture of propane and isobutane is fed to a single chromatographic column with a detector at the inlet and at the outlet, from Equation 9 we have for the phase $\phi_a$ at the outlet $$\phi_a = \tan^{-1}\frac{A_1 \sin \alpha_1 + A_2 \sin \alpha_2}{A_1 \cos \alpha_1 + A_2 \cos \alpha_2} \quad (14)$$

where subscript 1 refers to propane and subscript 2 refers to isobutane.

From Equation 7 we have $$A_1 + A_2 = 1 \quad (15)$$

Substituting Equation 15 in Equation 14 gives $$\phi_a = \frac{A_1 (\sin \alpha_1 - \sin \alpha_2) + \sin \alpha_2}{A_1 (\cos \alpha_1 - \cos \alpha_2 + \cos \alpha_2)} \quad (16)$$

which reduces to $$A_1 = \frac{\sin \alpha_2 - \tan \phi_a \cos \alpha_2}{\tan \phi_a (\cos \alpha_1 - \cos \alpha_2 - (\sin \alpha_1 - \sin \alpha_2)} \quad (17)$$

If by measurements, we find $\alpha_1 = -3.477$ radians
$\alpha_2 = -4.679$ radians
$\phi_a = 4.000$ radians Substituting in Equation 17 gives $A_1 = 0.56$
$A_2 = 0.44$ Accordingly, the propane in the sample is 56% and the i-butane is 44%.

*Example 2.*—The chromatograph generally is arranged as shown in FIGURE 1. The sine wave generator is a double-acting piston driven in simple harmonic motion operating in a ⅜ inch diameter cylinder. The piston stroke is 1½ inches.

Three column segments in series are used. Each column segment is a straight 12 inch length of ¼ inch outside diameter tube having an inside diameter of about 0.173 inch. Four thermal conductivity detectors, one at the inlet to the first column segment and at the outlets to the first, second and third column segments are used. The detectors are the thermal conductivity type, which employ thermistors as sensing elements.

The column packing is an organic ester on Teflon 6 (a polyfluorocarbon) beads. Ten parts of the ester liquid are used per 90 parts by weight of the Teflon 6 beads.

The sine wave generator and the column and detector assembly are located inside a thermostatted oven maintained at 55° C. The frequency of the motion of the piston is 4.8 cycles per minute ($\omega$ in Equation (8) is consequently 30.14 radians/minute).

Referring to FIGURE 1, the flow through line 11 is 20 cubic centimeters per minute (cc./min.) of a 1 mole percent mixture of the gas being analyzed in helium; the flow through line 12 is 30 cc./min. of pure helium and the flow through line 19 is 50 cc./min. of pure helium. The mixture produced at junction 13 is therefore the diluted sample gas stream and the gas in line 19 is the carrier gas stream. The pressure at the column inlet is 19.6 pounds per square inch absolute.

A mixture of propane, isobutane, neopentane, and cis-butene-2 is analyzed.

Following are the pure component phase angles and attenuation factors, or instrument constants of the present apparatus, in Equation (8). In the column heads numbers (1), (2), (3) and (4) are the subscripts denoting the identity of the component.

PURE COMPONENT PHASE ANGLES (RADIANS)

| Detector | Component | | | |
|---|---|---|---|---|
| | Propane (1) | Isobutane (2) | Neopentane (3) | Cis-butene-2 (4) |
| 1 ($\alpha$'s) | −1.818 | −2.457 | −3.252 | −3.757 |
| 2 ($\beta$'s) | −3.477 | −4.679 | −6.172 | −7.163 |
| 3 ($\gamma$'s) | −4.956 | −6.748 | −8.899 | −10.294 |

PURE COMPONENT ATTENUATION FACTORS

| | | | | |
|---|---|---|---|---|
| 1 (@$\alpha$'s) | 0.912 | 0.874 | 0.799 | 0.813 |
| 2 (@$\beta$'s) | 0.831 | 0.764 | 0.638 | 0.660 |
| 3 (@$\gamma$'s) | 0.757 | 0.667 | 0.509 | 0.537 |

The measured phase angles are (radians):
$\phi_a$—2.800
$\phi_\beta$—5.196
$\phi_\gamma$—5.071

By simultaneous solution of a set of 4 equations including Equation (7) and three of Equation (9), with appropriate constants from the table above, the following composition is determined. The analysis of the mixture by a conventional batch chromatograph is presented for comparison.

| | Continuous Gas Chromatograph | Batch Gas Chromatograph |
|---|---|---|
| Propane | 0.195 | 0.193 |
| Isobutane | 0.312 | 0.319 |
| Neopentane | 0.281 | 0.240 |
| Cis-Butene-2 | 0.212 | 0.248 |

The concentration units are such that the response of the detectors to all components is equal.

*Example 3.*—To the chromatograph described in Example 2, operated in the same way, and having the same pure component phase lags, and attenuation factors, a mixture of propane, isobutane and cis-butene-2 is fed.

The phase measured at the first detector is −2.351 and the amplitude is 0.692.

By simultaneous solution of Equation (7), Equation (9) and Equation (10), the following composition is determined.

| | Continuous Gas Chromatograph | Batch Gas Chromatograph |
|---|---|---|
| Propane | 0.394 | 0.402 |
| Isobutane | 0.426 | 0.417 |
| Cis-Butene-2 | 0.180 | 0.181 |

*Example 4.*—To the chromatograph described in Example 2 operated in the same way, and having the same pure component phase lags and attenuation factors, a mixture of propane, isobutane and neopentane is fed.

The amplitudes measured at the first and second detectors are 0.692 and 0.419, respectively. By applying Equation (7) and Equation (10), the following composition is determined.

| | Continuous Gas Chromatograph | Batch Gas Chromatograph |
|---|---|---|
| Propane | 0.394 | 0.402 |
| Isobutane | 0.426 | 0.417 |
| Neopentane | 0.180 | 0.181 |

The above examples illustrate the use of the present invention as to amplitude measurement alone, phase measurement alone, and amplitude and phase measurements in combination.

I claim:

1. A method for the continuous analysis of a fluid flow containing suspected components in unknown proportions comprising the steps of imparting an input variation to at least a portion of said flow through a chromatographic device, determining the variation in said flow at fixed different lengths of passage of said flow through said chromatographic device, and correlating the different determinations in the variation of the flow.

2. A method according to claim 1 wherein said flow is admixed with a carrier and said input variation and the variation in the flow at different lengths of passage through the chromatograph are variations in the degree of concentration of the flow in the carrier.

3. A method according to claim 2 wherein said variation in the degree of concentration of the flow in the carrier is cyclical.

4. A method according to claim 3 wherein said variations are determined as a function of the period of the said variations as a measurement in time.

5. A method according to claim 4 wherein said determination of the variations in the flow at said different lengths of travel through the chromatograph are determined as a phase angle relationship to the input variation.

6. A method according to claim 3 wherein the variations in said flow are determined as a measurement of the amplitude of said cyclical flow.

7. A method according to claim 6 wherein the response to said determinations are fed to a computer programmed to solve the equation $$H_\alpha = \sqrt{(A_1 \circledB_{\alpha_1} \sin \alpha_1 + A_2 \circledB_{\alpha_2} \sin \alpha_2 + \ldots + A_n \circledB_{\alpha_n} \sin \alpha_n)^2 + (A_1 \circledB_{\alpha_1} \cos \alpha_1 + A_2 \circledB_{\alpha_2} \cos \alpha_2 + \ldots + A_n \circledB_{\alpha_n} \cos \alpha_n)^2}$$

wherein $A_1, A_2 \ldots A_n$ represent the proportions of the individual components in the entire gaseous flow, where $\alpha_1, \alpha_2 \ldots \alpha_n$ represent the determined phase angle relationship between the input variation and the variation of each of the individual suspected components in radians at the different lengths of passage through the chromatograph and where $H_\alpha, H_\beta, H_\nu, H_\delta \ldots$ represent half the difference of the maximum and minimum of the variation in the degree of concentration of the sample gas at each of the points of determination.

8. A method for the continuous analysis of a gaseous flow containing suspected components in unknown proportions comprising the steps of imparting a determinable input variation to the flow of each of the suspected components individually through a chromatographic device, determining a first relationship with time between the input variation and the variation of each of the suspected components individually at pre-determined different lengths of passage through the chromatographic device, imparting the same input variation to the entire gaseous flow through the chromatographic device, determining second relationship with time between the said input variation and the resulting variation in the entire gaseous flow at the same pre-determined different lengths of passage through the chromatographic device and correlating these relationships of the components individually and of the entire gaseous flow.

9. A method according to claim 8 wherein said variations of the components individually and of the entire gaseous flow are variations in the degree of concentration of the components or of the entire flow in a carrier medium.

10. A method for the continuous analysis of a gaseous flow containing suspected components in unknown proportions comprising the steps of imparting a sinusoidal input variation to the flow of each of the suspected components of the gaseous flow individually through a chromatographic device, determining the phase angle and attenuation relationships between the input variation and the variation of each of the individual pure components at a predetermined length of passage through the chromatographic device, imparting the same input variation to the entire gaseous flow through the chromatographic device, determining the phase angle relationship between the input variation and the variation of the entire gaseous flow at the same pre-determined length of passage through the chromatographic device, substituting this second phase angle relationship into the equation $$\phi_\alpha = \tan^{-1} \frac{A_1 \circledB_{\alpha_1} \sin \alpha_1 + A_2 \circledB_{\alpha_2} \sin \alpha_2 + \ldots + A_n \circledB_{\alpha_n} \sin \alpha_n}{A_1 \circledB_{\alpha_1} \cos \alpha_1 + A_2 \circledB_{\alpha_2} \cos \alpha_2 + \ldots + A_n \circledB_{\alpha_n} \cos \alpha_n}$$

where $A_1, A_2 \ldots A_n$ represent the proportions of the individual components in the entire gaseous flow, where $\alpha_1, \alpha_2 \ldots \alpha_n$ represent the determined phase angle relationship between the input variation and the variation of each of the individual suspected components in radians at that particular pre-determined length of passage through the chromatographic device, and where $$\circledB_{\alpha_1}, \circledB_{\alpha_2} \ldots \circledB_{\alpha_n}$$

represent attenuation factors at the predetermined length for the individual suspected components, and repeating the above operation at a number of different lengths of passage through the chromatographic device whereby the different equations thus developed may be simultaneously solved to determine the proportions of the individual components in the entire gaseous flow.

11. The method of claim 10 in which one of the equations simultaneously solved is $$1 = A_1 + A_2 + \ldots + A_n$$

12. A method for the continuous analysis of a gaseous flow containing suspected components in unknown proportions comprising the steps of imparting a sinusoidal input variation to the flow of each of the suspected components of the gaseous flow individually through a chromatographic device, determining the phase angle and attenuation relationships between the input variation and the variation of each of the individual pure components at a predetermined length of passage through the chromatographic device, imparting the same input variation to the entire gaseous flow through the chromatographic device, determining the amplitude relationship between the input variation and the variation of the entire gaseous flow at the same pre-determined length of passage through the chromatographic device, substituting this amplitude relationship into the equation $$H_\alpha = \sqrt{(A_1 \circledB_{\alpha_1} \sin \alpha_1 + A_2 \circledB_{\alpha_2} \sin \alpha_2 + \ldots + A_n \circledB_{\alpha_n} \sin \alpha_n)^2 + (A_1 \circledB_{\alpha_1} \cos \alpha_1 + A_2 \circledB_{\alpha_2} \cos \alpha_2 + \ldots + A_n \circledB_{\alpha_n} \cos \alpha_n)^2}$$

where $A_1, A_2 \ldots A_n$ represent the proportions of the individual components in the entire gaseous flow, where $\alpha_1, \alpha_2 \ldots \alpha_n$ represent the determined phase angle relationship between the input variation and the variation of each of the individual suspected components in radians at that particular pre-determined length of passage through the chromatographic device, and where $$\circledB_{\alpha_1}, \circledB_{\alpha_2} \ldots \circledB_{\alpha_n}$$

represent attenuation factors at the predetermined length for the individual suspected components, and repeating the above operation at a number of different lengths of passage through the chromatographic device whereby the different equations thus developed may be simultaneously solved to determine the proportions of the individual components in the entire gaseous flow.

13. The method of claim 12 in which one of the equations simultaneously solved is $$1 = A_1 + A_2 + \ldots + A_n$$

14. A method for the continuous analysis of a gaseous flow containing suspected components in unknown proportions comprising the steps of imparting a sinusoidal input variation to the flow of each of the suspected components of the gaseous flow individually through a chromatographic device, determining the phase angle and attenuation relationships between the input variation and the variation of each of the individual pure components at a predetermined length of passage through the chromatographic device, imparting the same input variation to the entire gaseous flow through the chromatographic device, determining the phase angle and attenuation relationships between the input variation and the variation of the entire gaseous flow at the same predetermined length of passage through the chromatographic device, substituting the phase angle relationship into the equation $$\phi_\alpha = \tan^{-1} \frac{A_1 \circledH_{\alpha_1} \sin \alpha_1 + A_2 \circledH_{\alpha_2} \sin \alpha_2 + \ldots + A_n \circledH_{\alpha_n} \sin \alpha_n}{A_1 \circledH_{\alpha_1} \cos \alpha_1 + A_2 \circledH_{\alpha_2} \cos \alpha_2 + \ldots + A_n \circledH_{\alpha_n} \cos \alpha_n}$$

and the attenuation relationship into the equation $$H\alpha = \sqrt{(A_1 \circledH_{\alpha_1} \sin \alpha_1 + A_2 \circledH_{\alpha_2} \sin \alpha_2 + \ldots + A_n \circledH_{\alpha_n} \sin \alpha_n)^2 + (A_1 \circledH_{\alpha_1} \cos \alpha_1 + A_2 \circledH_{\alpha_1} \cos \alpha_2 + \ldots + A_n \circledH_{\alpha_n} \cos \alpha_n)^2}$$

where $A_1, A_2 \ldots A_n$ represent the proportions of the individual components in the entire gaseous flow, where $\alpha_1, \alpha_2 \ldots \alpha_n$ represent the determined phase angle relationship between the input variation and the variation of each of the individual suspected components in radians at that particular pre-determined length of passage through the chromatographic device, and where $$\circledH_{\alpha_1}, \circledH_{\alpha_2} \ldots \circledH_{\alpha_n}$$

represent attenuation factors at the predetermined length for the individual suspected components, and repeating the above operation at a number of different lengths of passage through the chromatographic device whereby the different equations thus developed may be simultaneously solved to determine the proportions of the individual components in the entire gaseous flow.

15. The method of claim 14 in which one of the equations simultaneously solved is $$1 = A_1 + A_2 + \ldots + A_n$$

16. A method according to claim 10 wherein the number of different lengths of passage through the chromatographic device at which the phase angle relationship is determined is equal to at least one less than the number of suspected components in said gaseous flow.

17. A method according to claim 12 wherein the number of different lengths of passage through the chromatographic device at which the phase angle relationship is determined is equal to at least one less than the number of suspected components in said gaseous flow.

18. A method according to claim 14 wherein the number of different lengths of passage through the chromatographic device at which the phase angle relationship is determined is equal to at least one less than the number of suspected components in said gaseous flow.

19. A method according to claim 18 wherein the suspected individual components and the entire gaseous flow are admixed with a carrier gas prior to and during their entrance to and passage through the chromatographic device.

20. A method according to claim 19 wherein the input variation of the individual components and of the entire gaseous flow is a variation in the degree of concentration of the individual components and of the entire gaseous flow in the carrier gas.

21. A method according to claim 20 wherein the mixture of the entire gaseous flow and the carrier gas passes through said chromatographic device at a constant volume rate of flow.

22. A method for the continuous analysis of a gaseous flow containing suspected components in unknown proportions comprising the steps of imparting a sinusoidal input variation to the flow of each of the suspected components of the gaseous flow individually through a chromatograph, determining the phase angle relationship between the input variation and the variation of each of the individual components at a pre-determined length of passage through the chromatograph, imparting the same input variation to the entire gaseous flow through the chromatographic device, determining the phase angle relationship between the input variation and the variation of the entire gaseous flow at the same pre-determined length of passage through the chromatograph, repeating the above operation, determining the same phase angle relationship at a number of different lengths of passage through the chromatograph and feeding the responses of such determinations to a computer programmed to solve the equation below for $A_1, A_2 \ldots A_n$, where $A_1, A_2 \ldots A_n$ represent the proportions of the individual components in the entire gaseous flow, where $\text{alpha}_1, \text{alpha}_2 \ldots \text{alpha}_n$ represent the determined phase angle relationship between the input variation and the variation of each of the individual suspected components in radians at the different lengths of passage through the chromatograph and where $\phi_\alpha, \phi_\beta, \phi_\gamma, \phi_\delta \ldots$ is equal to the phase angle relationship between the input variation and the variation at the respective different lengths of passage through the chromatograph.

$$\phi_\alpha = \tan^{-1} \frac{A_1 \sin \alpha_1 + A_2 \sin \alpha_2 + \ldots + A_n \sin \alpha_n}{A_1 \cos \alpha_1 + A_2 \cos \alpha_2 + \ldots + A_n \cos \alpha_n}$$

(5)

23. A method for determining the quantitative proportions of individual components in the flow of a gaseous mixture comprising admixing varying quantities of an inert carrier gas with the gaseous flow, passing the mixture of said flow and said carrier gas through a chromatograph, and reading at pre-determined different lengths along said chromatograph the changes in the degree of concentration of gaseous flow in the carrier gas with the passage of time.

24. A method for quantitatively determining the proportions of gaseous ingredients in a sample gaseous flow comprising admixing said sample with a carrier gas, varying the degree of concentration of the sample gas in the carrier gas, passing the mixture of the sample gas and carrier gas through a chromatographic column, and reading the varying degree of concentration of the sample gas in the carrier gas at pre-determined different points along the length of the column.

25. A method for quantitatively measuring the amounts of a given number of constituents in a sample gaseous flow comprising admixing the sample flow with an inert carrier gas, cyclically varying the degree of concentration of the sample gas in the carrier gas, passing the cyclically varying mixture of the sample and carrier gases through a chromatographic column of relatively short length, determining the cyclical variation in the concentration of the sample gas in the carrier gas at at least one end of said chromatographic column, passing this same gas through another chromatographic column of relatively short length, determining the degree of concentration of the sample gas in the carrier gas at at least one end of this second chromatographic column, and continuing to so pass the same gas through additional relatively short chromatographic columns and to measure the degree of concentration of the sample gas in the carrier gas at at least one end of each until the number of such measurements is equal to the number of the components in the sample gas.

26. A method according to claim 25 wherein the degree of concentration of the sample gas in the carrier gas is determined as the function of a physical property of the mixture of the carrier and sample gases.

27. A method for quantitatively measuring the proportions of gaseous ingredients in a sample flow of a binary mixture of gases comprising admixing said sample with a carrier gas, varying the degree of concentration of the sample gas in the carrier gas, reading the variation in the degree of concentration of the sample gas in the carrier gas, passing the mixture of sample and carrier gases through a chromatograph, and reading the varying degree of concentration of the sample gas in the carrier gas after it has passed through said chromatograph.

28. A method for quantitatively determining the proportions of a given number of constituent gases in a sample gaseous flow comprising admixing the sample flow with an inert carrier gas, cyclically varying the concentration of the sample gas in the carrier gas, passing portions of the cyclically varying mixture of the sample and carrier gases simultaneously through at least two chromatographic columns, each of which columns is of a different length, and reading the variations in the degree of concentration of the sample gas in the carrier gas at at least one end of each of said chromatographic columns.

29. A method according to claim 28 wherein the number of said chromatographic columns is equal to the given number of constituent gases in said sample.

30. A method according to claim 20 where a determination of the variation in the degree of concentration of the sample flow in the carrier gas is made before the mixture of the carrier gas and the sample flow through any of the chromatographic columns and the number of chromatographic columns is equal to one less than the given number of the constituent gases.

31. An apparatus for the continuous analysis of a gaseous flow comprising means for continuously withdrawing a sample of said gaseous flow, means for admixing this sample with a carrier gas, means for varying the concentration of said sample in said carrier, a chromatographic device, means for passing the varying mixture of said carrier and sample gases along said chromatographic device, and means for determining the degree of concentration of the sample gas in the carrier gas at different lengths of passage along the chromatographic device.

32. An apparatus according to claim 31 wherein the means for determining the concentration of sample gas at different lengths of passage along the chromatographic device comprise a thermal conductivity cell.

33. An apparatus according to claim 32 wherein said thermal conductivity cell comprises an electrical bridge circuit comprising at least one fixed resistor and at least one resistance heating element located in the flow of the mixture of the sample and carrier gases and means for reading the output of the bridge circuit.

34. An apparatus for the continuous analysis of a gaseous flow comprising means for continuously withdrawing a sample of said gaseous flow, means for admixing this sample with carrier gas, means for cyclically varying the concentration of said sample in said carrier, a chromatographic column which retards the flow of the respective components of the sample, means for passing the varying mixtures of said carrier and sample gases along said chromatographic device, and means for determining the varying degree of concentration of the sample gas in the carrier gas at different lengths of passage along the chromatographic device.

35. An apparatus according to claim 34 wherein said means for cyclically varying the concentration of the sample gas in the carrier gas result in sinusoidally varying the concentration of the sample gas in the carrier gas.

36. An apparatus according to claim 35 wherein said means for sinusoidally varying the concentration of the sample gas in the carrier gas comprise a piston driven in simple harmonic motion within a cylinder.

37. An apparatus for the continuous analysis of a gaseous flow comprising means for admixing a sample of gaseous flow with a varying amount of a carrier gas, a chromatographic device comprising at least two relatively short chromatographic columns, means for passing the varying mixture of said sample and carrier gases continuously and successively through said columns, and means for determining the varying degree of concentration of the sample gas in the carrier gas at at least one end of each of said columns.

38. An apparatus for the continuous analysis of a gaseous flow comprising means for admixing a sample of said flow with a varying amount of a carrier gas, a chromatographic device comprising at least two relatively short chromatographic columns arranged in parallel, means for continuously passing a portion of the varying mixture of said sample and carrier gases through each of said parallel columns, and means for determining the varying degree of concentration of the sample gas in the carrier gas at at least one end of each of said columns.

39. An apparatus according to claim 38 wherein said relatively short chromatographic columns are of different lengths.

40. An apparatus according to claim 38 wherein said chromatographic columns are of the same length and wherein there are additional means for establishing different volume rates of flow through said columns.

41. An apparatus for the continuous analysis of a fluid containing a multiplicity of constituents, and comprising means for continuously mixing the fluid with an inert carrier fluid, means for varying the proportion of said mixture in the carrier fluid, a tubular conduit, an adsorbent contained within the said conduit, means for continuously feeding a sample of said varying mixture-carrier combinations to the column, means for detecting variation in the total concentration of sample mixture components in the aforesaid carrier fluid at points along said tubular conduit, means for comparing said total concentration variation with total concentration variation at the inlet to said tubular conduit and at some other point along said tubular conduit, and means for relating differences in said total concentration variations to the proportions of respective components in said original multicomponents mixture.

42. The apparatus of claim 34 in which the input variation of total concentration of said multicomponent mixture in the carrier fluid is sinusoidal and in which phase and amplitude of the said total concentration sinusoidal waves are detected at points along the column and means for relating observed variations in phase and amplitude to the proportions of respective components in said original multicomponent mixtures.

No references cited.

RICHARD C. QUEISSER, *Primary Examiner.*

JOSEPH P. STRIZAK, *Examiner.*

UNITED STATES PATENT OFFICE
CERTIFICATE OF CORRECTION

Patent No. 3,236,092                      February 22, 1966

Don E. Carter

It is hereby certified that error appears in the above numbered patent requiring correction and that the said Letters Patent should read as corrected below.

Column 6, line 41, cancel "$C_{1\alpha}(t)$". Column 8, equation (10) should appear as shown below:

$$H\alpha = \sqrt{(A_1^{(H)}{}_{\alpha_1} \sin\alpha_1 + A_2^{(H)}{}_{\alpha_2} \sin\alpha_2 + \ldots + A_n^{(H)}{}_{\alpha_n} \sin\alpha_n)^2 + (A_1^{(H)}{}_{\alpha_1} \cos\alpha_1 + A_2^{(H)}{}_{\alpha_2} \cos\alpha_2 + \ldots + A_n^{(H)}{}_{\alpha_n} \cos\alpha_n)^2}$$

Column 9, line 30, "Fourier transformer" should read -- Fourier transform --; line 32, "$C_2(t)$, $C_3(t)\ldots C_n(t)$." should read -- $c_2(t)$, $c_3(t)\ldots c_n(t)$. --. Column 11, equation (16) should appear as shown below:

$$\phi_\alpha = \tan^{-1} \frac{A_1(\sin\alpha_1 - \sin\alpha_2) + \sin\alpha_2}{A_1(\cos\alpha_1 - \cos\alpha_2) + \cos\alpha_2}$$

equation (17) should appear as shown below:

$$A_1 = \frac{\sin_{\alpha 2} - \tan\phi_\alpha \cos_{\alpha 2}}{\tan\phi_\alpha (\cos_{\alpha_1} - \cos_{\alpha_2}) - (\sin_{\alpha_1} - \sin_{\alpha_2})}$$

Column 15, lines 17 to 20, the formula should appear as shown below:

$$H\alpha = \sqrt{(A_1 \textcircled{H} \alpha_1 \sin \alpha_1 + A_2 \textcircled{H} \alpha_2 \sin \alpha_2 + \ldots + A_n \textcircled{H} \alpha_n \sin \alpha_n)^2 + (A_1 \textcircled{H} \alpha_1 \cos \alpha_1 + A_2 \textcircled{H} \alpha_2 \cos \alpha + \ldots + A_n \textcircled{H} \alpha_n \cos \alpha_n)^2}$$

Signed and sealed this 11th day of November 1969.

(SEAL)
Attest:

EDWARD M. FLETCHER, JR.
Attesting Officer

WILLIAM E. SCHUYLER, JR.
Commissioner of Patents